United States Patent [19]
Busey

[11] 3,866,424
[45] Feb. 18, 1975

[54] HEAT SOURCE CONTAINING RADIOACTIVE NUCLEAR WASTE

[75] Inventor: Harold M. Busey, Bethesda, Md.

[73] Assignee: The United States of America as represented by the United States Atomic Energy Commission, Washington, D.C.

[22] Filed: May 3, 1974

[21] Appl. No.: 466,770

[52] U.S. Cl. .................. 60/644, 165/105, 122/32
[51] Int. Cl. .................. F03g 7/06, F01k 27/00
[58] Field of Search .......... 165/105; 122/32; 60/644

[56] References Cited
UNITED STATES PATENTS

| | | | |
|---|---|---|---|
| 3,435,617 | 4/1969 | Wagle | 60/644 |
| 3,516,487 | 6/1970 | Keiser | 165/105 |
| 3,525,386 | 8/1970 | Grover | 165/105 X |
| 3,613,773 | 10/1971 | Hall et al. | 165/105 X |
| 3,672,443 | 6/1972 | Bienert et al. | 165/105 X |

FOREIGN PATENTS OR APPLICATIONS

| | | | |
|---|---|---|---|
| 340,281 | 9/1959 | Switzerland | 165/105 |

Primary Examiner—Martin P. Schwadron
Assistant Examiner—Allen M. Ostrager
Attorney, Agent, or Firm—John A. Horan; Arthur A. Churm; Frank H. Jackson

[57] ABSTRACT

A heat source includes packages or cans of radioactive heat-producing nuclear waste material contained in vertically disposed heating tubes immediately surrounded and cooled by a "spare" coolant at its boiling temperature which in turn is surrounded by a "primary" coolant from which useful heat is extracted. Immediately above the primary coolant chamber is an emergency coolant chamber which cools vapors of the boiling liquid when an increase in heat caused by interruption of primary cooling causes an increase in the temperature of the boiling liquid so that vapors therefrom rise into a zone cooled by the emergency coolant. Heat pipes having a portion in thermal contact with the top of heating tubes and a portion exposed to the atmosphere are provided as also are fused which permit the radioactive material to drop into a canal beneath the normal heat source zone should all other means for removing heat fail.

6 Claims, 3 Drawing Figures

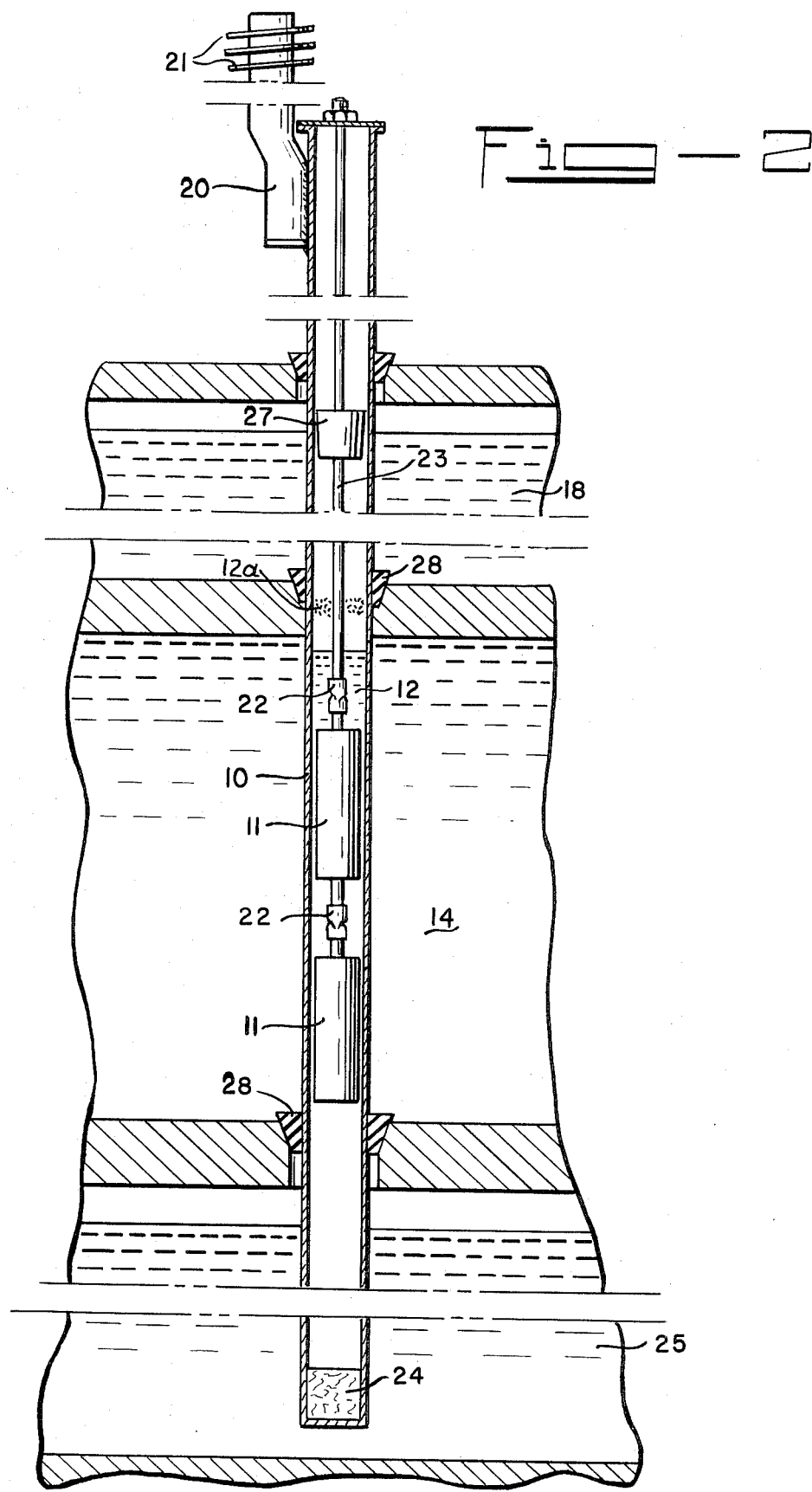

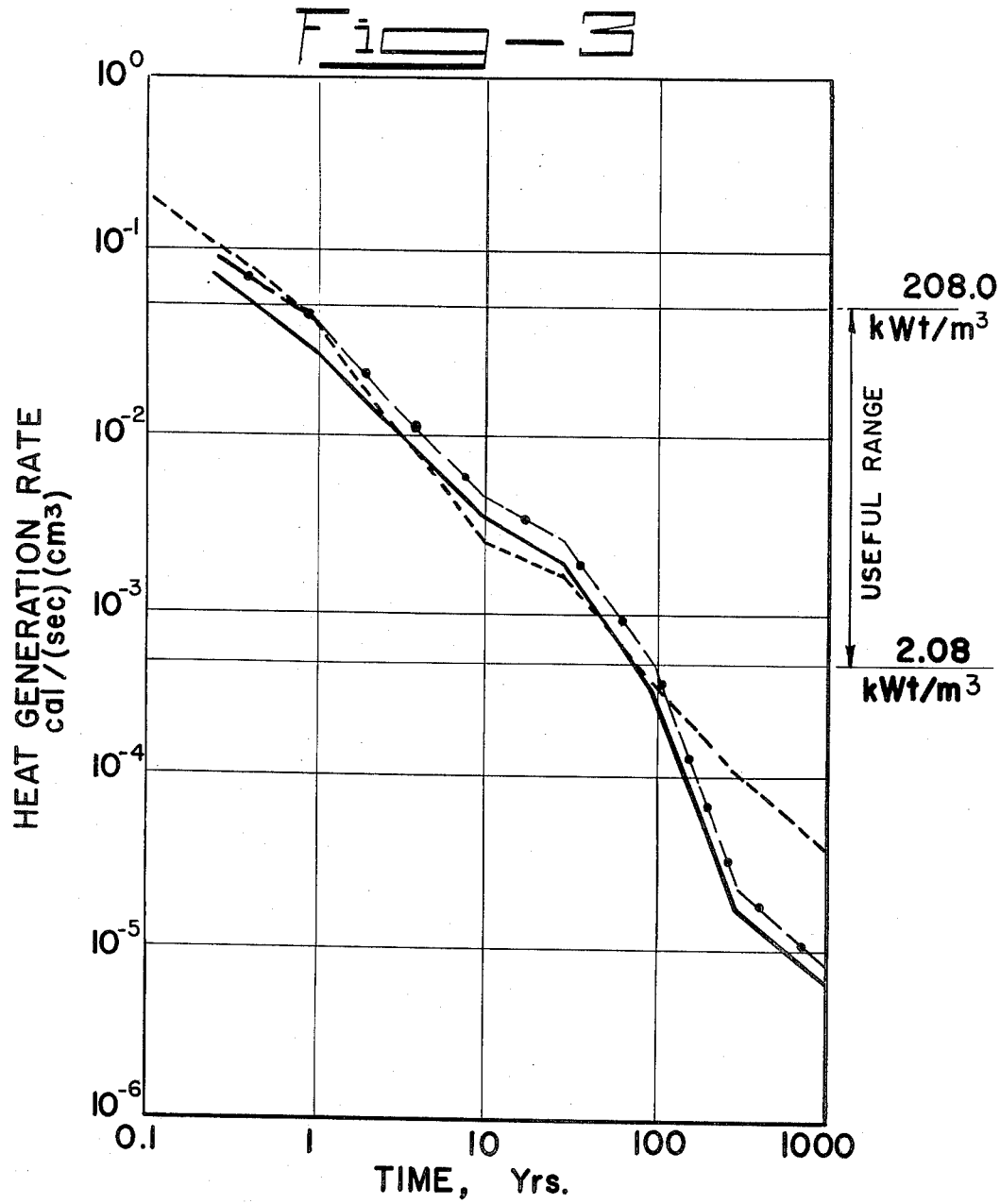
DECAY CURVES FOR WASTE FROM NUCLEAR FUEL
LEGEND:
——————— LWR FUEL; EXPOSURE 33,000 MWd/ton AT 30 MW/ton
—•—•— LWR FUEL; EXPOSURE 45,000 MWd/ton AT 30 MW/ton
— — — — LMFBR FUEL (CORE + BLANKET); EXPOSURE 33,000 MWd/ton AT 58 MW/ton
IN ALL THREE CASES IT IS ASSUMED THAT 1 m³ OF SOLID WASTE IS GENERATED BY THE REPROCESSING OF 10.7 tons OF FUEL.

HEAT SOURCE CONTAINING RADIOACTIVE NUCLEAR WASTE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a device for utilizing decay heat from radioactive nuclear wastes. In more detail, the invention relates to a power plant wherein the heat source utilizes the decay heat of radioactive nuclear wastes. In still more detail, the invention relates to a device for steam and electrical power generation by heat from fission products and other nuclear wastes wherein safety of containment is insured by the presence of several backup systems that remove heat in the event of the failure of the normal heat-removal system.

Fission products and other nuclear waste materials are produced in large quantities during normal production of nuclear power, and the Federal Government and industry are burdened with responsibility for the safe storage and ultimate disposal of this material. Disposal and storage of this material is very expensive; therefore, many studies have been made to find uses for these materials and thereby reduce waste management and disposal costs.

Potential uses fall into three classes: a source of radiation, a source of heat and a source of valuable elements such as palladium. The demand for fission products as irradiation sources in no way approaches the quantity available at this time. Also large markets for decay heat and individual rare elements have not been developed.

Spent fuel elements removed from a nuclear reactor contain uranium and plutonium (and possibly thorium) which are of sufficient value to make their recovery for reuse worth while. Normally, spent fuel elements are dissolved and valuable constituents are separated from radioactive waste by solvent extraction.

The compositions of radioactive wastes vary, depending on the original fuel and cladding compositions, the degree of fission burnup, the fuel reprocessing and waste processing procedures used, and the cooling time. A cooling time of about 6 months would be expected to elapse between removal of spent fuel from a reactor core and the completion of waste processing. Highly radioactive waste contains fission products, actinide elements, clad and other materials. When this mixture has been converted to solid form, it is a suitable heat source for the invention.

Another source suitable for heat is a mixture of long-half-life, heat-producing elements that has been separated from the bulk of the waste for separate storage. The purpose of such separation is to lessen the heat disposal problem in storing the bulk of the waste. At present, $^{90}$Sr and $^{137}$Cs are separated from other radioactive materials for this purpose. In one procedure, strontium and cesium salts are encapsulated in double-wall stainless steel capsules 60 cm long (2 feet) and 10 cm in diameter (4 inches). Then this highly radioactive waste is stored under water for long periods for shielding and cooling purposes. Other heat producers are some of the actinide elements of higher atomic number that build up when plutonium is recycled as a nuclear fuel. If the chemical elements having heat-producing isotopes with half-lives longer than 3 years are separated from other wastes, a concentrated heat source can be obtained.

SUMMARY OF THE INVENTION

According to the present invention, capsules containing solidified radioactive wastes are suspended in vertically disposed heater tubes containing a refluxing coolant under pressure from gas. The vertical heater tubes are surrounded by a heater box containing a primary coolant which is used to produce steam and which is cooled by a shutdown heat exchanger when the steam-producing function is not in use. A backup coolant box is provided surrounding the heater tubes immediately above the heater box. The coolant therein condenses vapors of the refluxing coolant when the primary coolant is not functioning to cool the heater tubes. As a backup, air-cooled heat pipes are provided in thermal contact with the top of the heater tubes and as an ultimate safety precaution a canal containing a compatible coolant is provided below the heater box, with melting of a fuse causing the radioactive material to drop into the canal, should all else fail.

DESCRIPTION OF THE FIGURES

FIG. 2 is an enlarged view of a single heater tube.

FIG. 3 is a graph giving decay curves for wastes from nuclear fuels of several types and burnups. This graph is based on information from ORNL-4762, February 1972.

SPECIFIC EMBODIMENT OF THE INVENTION

Figure 1:
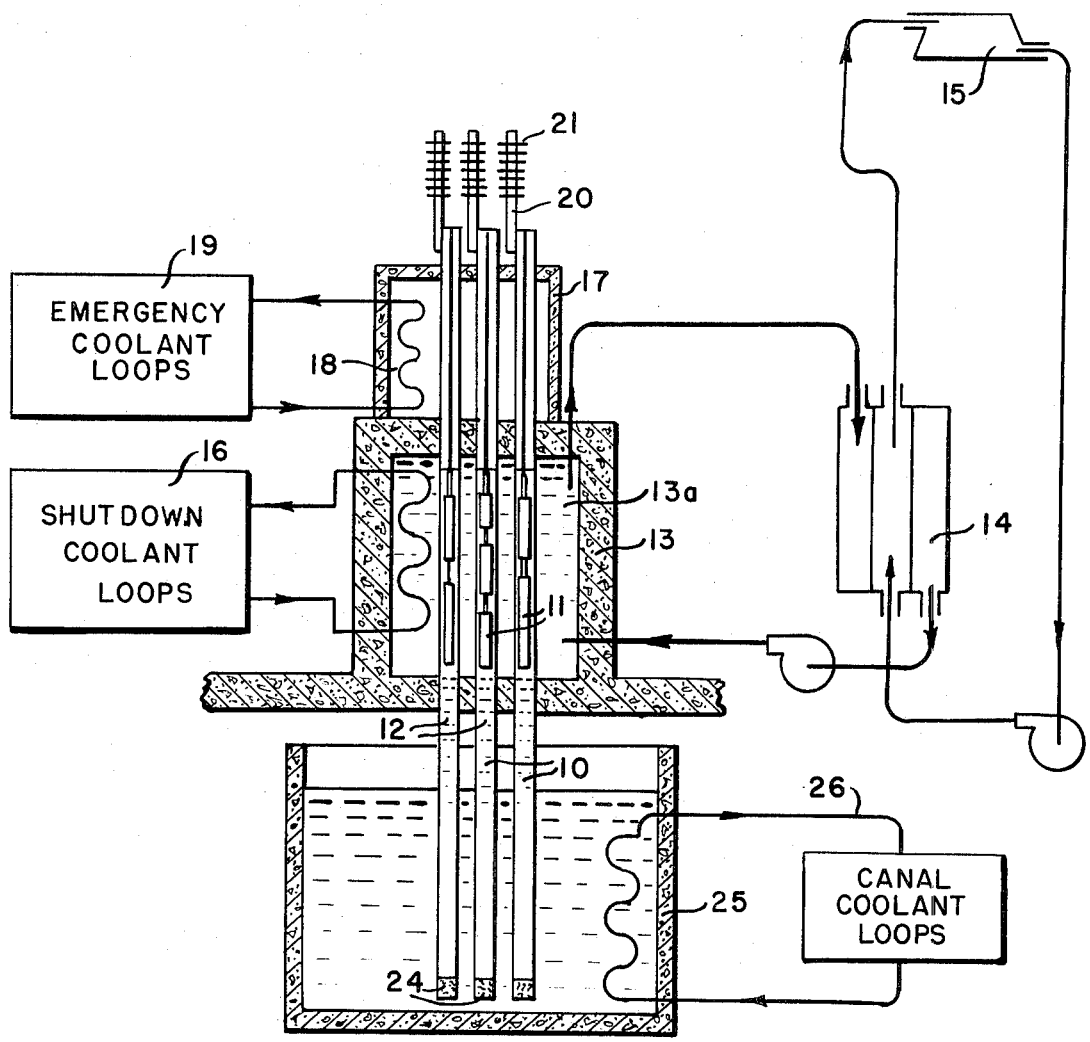
FIG. 1 is a schematic plan of a power plant containing the heat source of the present invention.

As shown, a power plant containing the heat source of the present invention includes a plurality of sealed, vertically disposed heater tubes 10, each of which encloses one or more capsules 11 containing solidified radioactive wastes. Capsules 11 are cooled directly by heating a refluxing coolant 12 within heater tubes 10. Surrounding heater tubes 10 at the elevation of the capsules 11 is a heater box 13 containing a primary coolant 13a, heater tubes 10 extending above and below the heater box 13. The refluxing coolant within heater tubes 10 is pressurized by an inert gas within the heater tubes to essentially completely condense below the top of heater box 13 during normal operation of the heat source.

Under normal operation coolant is circulated from primary heater box 13 through heat exchanger 14 to heat gas or to boil water, producing steam for use in steam turbine 15. Redundant shutdown coolant loops 16 are provided to cool the primary coolant in heater box 13 when steam turbine 15 is shut down.

Immediately above heater box 13 and also surrounding heater tubes 10 — which extend through and above them — is backup coolant box 17 containing an emergency coolant 18 which is cooled by redundant emergency coolant loops 19. Should both steam turbine 15 and shutdown coolant loops 16 be out of service, the coolant in backup coolant box 17 will cool the refluxing coolant 12.

Since heater tubes 10 contain a coolant which is at its boiling point during normal operation plus a noncondensable inert gas, the position of the interface zone 12a between the noncondensable gas and the vapor from the refluxing liquid at various temperatures can be controlled by control of the pressure and volume of the noncondensable gas. Should heat flow both by way of heat exchanger 14 and shutdown coolant loop 16 be interrupted, the temperature of the capsules 11 rises. This causes the noncondensable gas to be forced upward by compression within the heater tubes and allows the vapors from the refluxing liquid to rise into the section of the heater tubes that is within the backup coolant box 17 located above the heater box 13. In the region of the backup coolant box, the refluxing vapor condenses and the liquid formed falls back to the zone of the heat-producing capsules 11 where it is re-evaporated and continues to remove heat. The heater tube is thus an automatically controlled heat dump, because a rise in the liquid temperature (and therefore a pressure rise) causes the interface 12a to be forced upward and allows condensation in the emergency cooled zone. No valves are required for this changeover to emergency cooling; it is automatic.

As a further backup safety device, heat pipes 20 are disposed in heat-exchange relationship to the tops of heater tubes 10. The other end of heat pipes 20 are provided with fins 21 and extend out into the atmosphere for air cooling of the working fluid within the heat pipes. The heat pipes operate at outdoor temperature and automatically dispose of the heat directly to the atmosphere any time heat reaches the upper part of the heater tubes. This system can dispose of all of the decay heat if all of the previously discussed coolant loops become inoperative.

For the improbable case that all the above systems fail to function, a metal fuse 22 in support rod 23 for the capsules 11 will melt, permitting the fission product capsules to slide down the heater tubes 10 to shock absorbers 24 in the bottom thereof. The bottoms of the heater tubes are immersed in large tanks or canals 25 similar to those normally used for the storage of encapsulated radioactive materials. The coolant may be water, a salt or an organic or metallic liquid, the particular material being selected for its lack of reactivity with the refluxing coolant. Tank 25 is cooled by redundant coolant loops 26 and the volume of coolant therein is sufficient to provide adequate coolant for a substantial period even though this cooling means is interrupted.

Also shown in FIG. 2 are a shield block 27 in heater tube 10 for radiation shielding and pressure seals 28 through which heater tube 10 enters and leaves heater box 13.

It will be immediately apparent that crucial to this complete power system is the heater tube design which provides for a high level of safety of the system. The heater tubes serve several functions:

1. To deliver heat to the primary coolant.
2. To contain in the refluxing coolant any radioactive material that might leak from a capsule.
3. To assist in locating a leaking capsule.
4. To contain the refluxing coolant.
5. To act as a guide for falling capsules if the metal fuse should melt, releasing the capsules.

It will be appreciated that, while the application of the invention described here is to a power plant in which useful power is obtained by driving a turbine with steam generated by decay heat, the steam or a heated gas can also be used for other industrial, commercial or agricultural applications.

Estimates of the heat available and the cumulative volume of high-level nuclear waste from the power program between 1970 and 2025 have been made based on predictions of nuclear power plant construction. Using the approximation that an average of about 1 MWt is available as decay heat for each 1,000 MWe of installed nuclear power plant capacity, it is estimated that by 1990 over 300 MWt will be available in the United States. At a 33 percent conversion efficiency, this could produce 100 MWe.

Decay of the rate of heat production of fission products mixtures has been studied. Decay curves for waste from nuclear fuels of several types and burnups are shown in FIG. 3. In the use of this graph, it should be remembered that 6 months elapse between fuel removal from a reactor and the availability of useful heat. As to the volume of wastes required to generate a given quantity of heat, it is estimated that a cubic meter of partially aged waste will yield 10 kWt. Thus, for a 100 MWe decay heat power plant, 30,000 cubic meters of solidified waste would be needed. If the volume of coolant is approximately equal to the waste volume, a total enclosed and shielded heater space of 60,000 cubic meters would be necessary. Thus, the heat source for a 100-MWe power plant would have the volume of a cube 39 meters on an edge. This is very large, but construction is feasible. This volume would be decreased very much by an concentrating of the heat-producing fission products before their encapsulation.

A preliminary estimate has been made of the value of fission product decay heat if used to generate electricity. In the following estimate, it is assumed that an encapsulated heat-producing mixture is loaned at no charge to a small power plant to make use of the waste heat. It is also assumed that the electrical power at the bus bar is sold for 1 ¢/kWh, that the plant cost is $700/kWe, and that the plant operates at base load for 70 years for 100 percent of the time. Of course, the assumed load factor is higher than would be experienced, but the plant will be in operation most of the time because heat will be generated all of the time.

For the decay heat power plant, there is neither an expenditure for the heat source by the user, since the fission products are packaged for storage normally, nor is there an expenditure for waste management by the U.S. Government while the radioactive material is used as a heat source.

In the table below, a preliminary estimate of the cost of this decay heat power plant and the estimated return is given.

Decay Heat Power Plant Cost and Value of Power Produced

| | |
|---|---|
| Electrical power capacity | 100,000 kWe |
| Thermal capacity | 300,000 kWt |
| Plant cost at $700/kWe | $70 million |
| Cost of heat | 0 |
| Estimate of value of electrical power at bus bar | 1¢/kWh |
| Electrical power produced | $8.6 \times 10^8$ kWh/yr |
| Value of power | $8.6 \times 10^6$/yr |
| Power value for 70-year plant life | $600 million |
| Cost per year of operation | |
| Interest and amortization at 10%/year | $7 million |
| Salaries (20-man staff) | 0.4 million |
| Other operating costs | 0.2 million |
| Profit or contingency | 1.0 million |
| | $8.6 million/yr |

The embodiments of the invention in which an exclusive property or privilege is claimed are defined as follows:

1. A heat source comprising at least one sealed vertically disposed heater tube containing a boiling liquid pressurized by an inert noncondensable gas, at least one capsule containing solidified radioactive waste material suspended within each of said heater tubes and immersed in said boiling liquid, a heater box containing a primary coolant surrounding said heater tubes, the heater tubes extending above and below the heater box, means for extracting heat from said primary coolant, a backup coolant box containing emergency coolant surrounding said heater tubes immediately above said heater box and means for extracting heat from said emergency coolant, said heater tube being pressurized by the inert gas so that under normal operating conditions the interface zone between the inert gas and the vapors of the boiling liquid falls between the heater box and the backup coolant box.

2. Heat source according to claim 1 wherein the capsules are supported by support rods including a fusible metal section and including a canal containing a coolant liquid compatible with the boiling liquid disposed below the heater box with the lower end of the heater tubes immersed in the coolant liquid in the canal.

3. Heat source according to claim 1 and including heat pipes in thermal contact with the top of the heater tubes and extending out into the atmosphere.

4. Heat source according to claim 3 and including a shock absorber in the bottom of the heater tubes.

5. Heat source according to claim 4 wherein the means for extracting heat from the primary coolant include a heat exchanger producing steam and a steam turbine utilizing said steam to produce useful power.

6. Heat source according to claim 5 and including means for removing heat from the primary coolant when the steam turbine is closed down.

* * * * *